United States Patent [19]

Briggs et al.

[11] 4,004,068

[45] Jan. 18, 1977

[54] ELECTROCHEMICAL CELL OF A RECHARGEABLE NATURE

[75] Inventors: Donald C. Briggs, Mountain View; Ronald J. Haas, San Jose, both of Calif.

[73] Assignee: Aeronutronic Ford Corporation, Dearborn, Mich.

[22] Filed: June 7, 1976

[21] Appl. No.: 693,574

[52] U.S. Cl. .................................. 429/57; 429/101

[51] Int. Cl.[2] .......................................... H01M 10/34

[58] Field of Search .................. 429/57, 59, 61, 63, 429/72, 19, 17, 25, 101

[56] References Cited

UNITED STATES PATENTS

| | | | |
|---|---|---|---|
| 2,842,607 | 7/1958 | Germershauren et al. | 429/59 |
| 2,988,584 | 6/1961 | Peters | 429/59 |
| 3,565,691 | 2/1971 | Strier et al. | 429/25 |
| 3,669,744 | 6/1972 | Tsenter et al. | 429/101 |
| 3,867,199 | 2/1975 | Dunlop et al. | 429/59 X |

*Primary Examiner*—Anthony Skapars
*Attorney, Agent, or Firm*—William E. Johnson; Keith L. Zerschling

[57] ABSTRACT

A rechargeable electrochemical cell is disclosed which includes both a cathode and a gas generating and consuming anode housed within a closed container. A closed volume is provided within the container for storing the gas used by the cell. A separator and electrolyte storage material is located between the electrodes of the cell. A reservoir is formed of a material capable of storing electrolyte. This reservoir is in liquid transfer contact with the separator and electrolyte storage material between the electrodes. If any electrolyte of the cell stored in the separator and electrolyte storage material is vaporized into the gas storage volume, such electrolyte is replaced by transfer of electrolyte from the reservoir to the separator and electrolyte storage material.

6 Claims, 2 Drawing Figures

ELECTROCHEMICAL CELL OF A RECHARGEABLE NATURE

BACKGROUND OF THE INVENTION

U.S. Pat. No. 3,565,691 issued on Feb. 23, 1971 for a "High Energy Density Silver Oxide-Hydrogen Battery" shows a battery formed of electrochemical cells which generate hydrogen upon charging thereof. This hydrogen is stored within the battery container for use during discharge of the battery. Basically each cell of this battery consists of a silver cathode which is oxidized during charging, a gas generating and consuming anode which generates hydrogen during charging, and a separator and electrolyte storage material between the anode and the cathode which stores an aqueous electrolyte for each cell. The hydrogen generated during charging of each cell is stored in an open volume of the battery. The gas pressure of the open volume of the battery is an indication of the total charge of the battery. When the battery is discharged, hydrogen is consumed at the anode of the cell and the silver oxide cathode of each cell is reconverted to silver. During the discharge cycle the pressure of the open gas storage volume of the battery decreases. The battery may be alternatively charged and discharged over its period of useful life.

One application for use of such a silver hydrogen battery is in a space vehicle. In space applications, however, the battery is not subjected to normal gravitational forces. Under such conditions, electrolyte (i.e., water) contained in the separator and electrolyte storage material positioned between the electrodes of each battery cell can vaporize into the gas storage volume. This vaporized material generally condenses on the container walls defining the storage volume. Once the material is condensed on these walls, it is of course lost for future use as an electrolyte. The loss of electrolyte from the system reduces the total amount of hydrogen generating material available and thereby reduces the level to which the battery may be charged on a charging cycle. This action, in turn, reduces the total amount of energy which may be withdrawn from the battery during a discharge thereof.

It is an object of this invention to provide an improved rechargeable electrochemical cell for a battery which eliminates the reduction of battery capacity because of electrolyte loss.

It is another object of this invention to provide an improved rechargeable electrochemical cell for a battery which employs simple, but reliable, structure for reducing the loss of battery capacity because of electrolyte loss.

SUMMARY OF THE INVENTION

This invention relates to a rechargeable electrochemical cell for a battery and, more particularly, to such a rechargeable electrochemical cell for a battery in which a reduction of the capacity of the battery is eliminated because of the loss of electrolyte from operative portions of the battery.

In accordance with the teachings of this invention, a rechargeable electrochemical cell for a battery includes a closed container confining therewithin at least a cathode, a gas generating and consuming anode, a separator and electrolyte storage material between the cathode and the anode, an electrolyte in the separator and electrolyte storage material, and an open volume for gas storage. The improvement comprises providing within the closed container a reservoir formed of a material capable of storing electrolyte. The reservoir is in liquid transfer contact with the separator and electrolyte storage material between the cathode and the anode. Any loses of electrolyte from the separator and electrolyte storage material are substantially replaced by transfer of electrolyte from the reservoir to the separator and electrolyte storage material.

In accordance with further teachings of this invention, if desired, the material forming the reservoir may extend between at least two cathode-anode cell combinations and be in liquid transfer contact with the separator and the electrolyte storage materials associated with each of such cell combinations. Also, if desired, the material forming the reservoir and the separator and electrolyte storage material between the electrodes of each cell may be made of the same material.

DESCRIPTION OF THE PREFERRED EMBODIMENT

Figure 1:
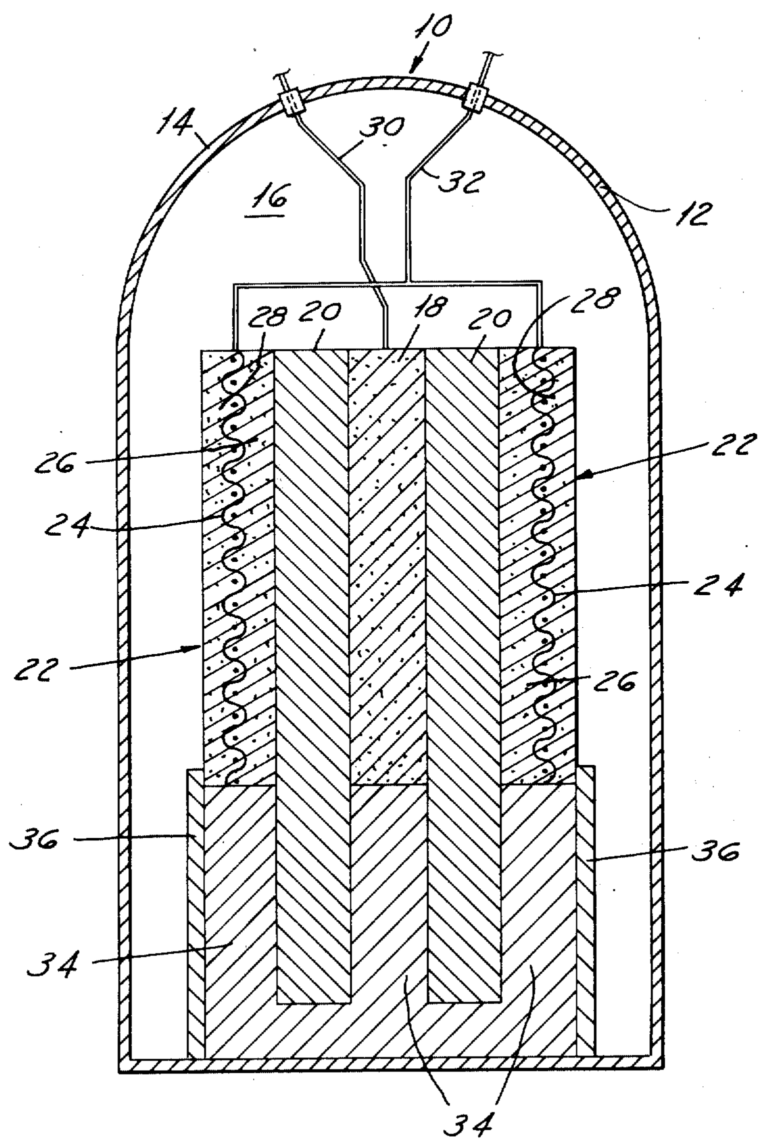
FIG. 1 is a schematic drawing of a rechargeable electrochemical cell for a battery system in accordance with the teachings of this invention.
Figure 2:
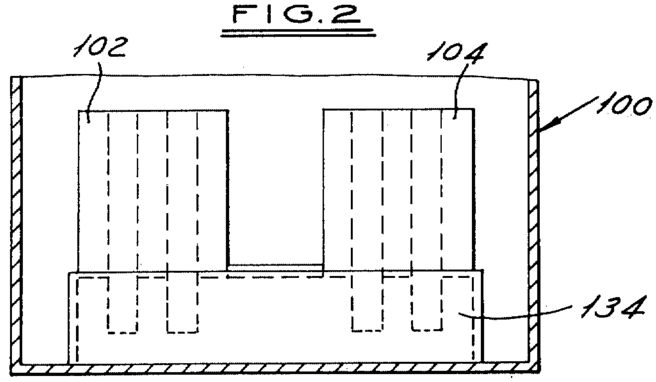
FIG. 2 is a schematic drawing of a rechargeable electrochemical cell such as shown in FIG. 1 wherein two cells are contained within a single container.

In the drawings there is shown in FIG. 1 a single, rechargeable electrochemical cell, generally identified by the numeral 10. This cell may be used by itself, or grouped with other cells such as illustrated in FIG. 2, to form a battery. In particular, the cell of the preferred embodiment is of a silver-hydrogen type discussed generally in the aforementioned U.S. Pat. No. 3,565,691. The cell may also be of a construction such as taught in U.S. patent application Ser. No. 492,406 filed Aug. 29, 1974 for a "Rechargeable Silver-Hydrogen Battery", which application is assigned to the same assignee as this application and is hereby incorporated by reference.

In accordance with a preferred construction for the electrochemical cell 10, a container 12 is provided. This container is formed from a high strength material such as type 718A Inconel so that it resits high pressure of hydrogen when that gas is generated internally of the cell as will be discussed in a later portion of this specification. The container is cylindrical in cross section at its lower portion and is provided with a domed upper portion 14 which encloses a gas storage volume 16.

A silver cathode 18 is provided which has a circular cross section. When the cell 10 of the battery is charged, the silver cathode acts as an anode and is oxidized to silver oxide. Upon discharge, the silver cathode acts as a cathode and the silver oxide is reduced to silver. This silver cathode may be formed by compressing Handy and Horman SIL Powder 130 in a mold to 2500 psi and then sintering at 625° F for 5 minutes. In this manner the silver cathode is porous and it has a very high surface area per unit volume.

Encircling the silver cathode 18 is a separator and electrolyte storage material 20 which in the preferred embodiment extends beyond the bottom of the silver cathode. In the preferred embodiment, the separator and electrolyte storage material has a ring shaped cross section and is formed of a non-woven nylon such as the material sold under the tradename Pellon 2505 by Pellon Corporation at 221 Jackson St., Lowell, Mass. 01852. The material may also be made of a fuel cell grade asbestos such as sold by the Johns-Manville Company of Greenwood Plaza, Denver, Colo. 80217. The material serves two basic functions. The first function is that the material stores the aqueous electrolyte, in this case a 30% solution of postassium hydroxide, in open pores of the material so that the electrolyte is available during the charge and discharge of the cell to carry out its chemical function. The second function of this material is that it serves as a medium for conducting the electrolyte from one zone of the cell to another along with the ions to be transferred from one electrode to another. Since this material is continuous in nature, the concentration of electrolyte in one zone will be equal to the concentration of electrolyte in any other zone thereof. If any disruption of the concentration takes place in a particular zone, electrolyte will be transferred to the zone of reduced electrolyte by the capillary nature of the pore structure of the material. Thus, the concentration of the electrolyte is balanced throughout the cell by use of this separator and electrolyte storage material.

On the outside of the separator and electrolyte storage material 20 is found a gas generating and consuming anode, generally identified by the numeral 22. This anode, in the preferred embodiment, has a ring shaped cross section. This anode is described more fully in the mentioned application Ser. No. 492,406. This anode may be manufactured by coating a fourteen mesh nickel screen 24 on one side with a liquid, semi-permeable catalytic mixture 26 containing platinum black which is the catalyst. The other side is coated with porous Teflon 28, the pores of which are made sufficiently large to render the layer easily permeable to gaseous hydrogen but small enough generally to be impermeable to the electrolyte contained in the separator and the electrolyte storage material 20. Since Teflon is not wet by water, the coating is water proof and hydrophobic. The active platinum black of the catalytic mixture 26 is held by a Teflon binder and is also made sufficiently porous to be permeable to hydrogen gas but generally impermeable to the electrolyte. Thus, by virtue of the anode construction, during discharges of the cell, gaseous hydrogen will contact the electrolyte at the catalytic interface that, in turn, promotes ionization of hydrogen so that it enters into the cell reaction.

An electrical lead 30 is connected to the silver cathode 18 while an electrical lead 32 is connected to the gas generating and consuming anode 22. These electrical leads are used during charging and discharging of the cell of the battery for the purpose of conducting electrons between the electrodes. During battery charge, the silver cathode is oxidized to silver oxide while hydrogen gas is produced at the gas generating and consuming anode 22. The hydrogen gas fills the gas storage volume 16 thereby building up a gas pressure in this volume. Upon full charge of the battery, the maximum gas pressure will be found in the gas storage volume. The oxygen for oxidizing the silver electrode comes from the water of the aqueous solution. Thus, the concentration of the water in the aqueous solution is reduced during charging of the battery, the amount of reduction being determined by the charge built up in the cell. Upon discharge of the cell of the battery, hydrogen is consumed at the gas generating and consuming anode 22 and the silver oxide of the silver cathode 18 is reduced to silver. In space applications, the cell 10 may be charged through a device such as a solar cell illuminated by the sun.

In accordance with the teachings of this invention, a reservoir 34 is provided within the container 12. This reservoir is separated from the interior of the cell by means of a separating wall 36 formed of the same material as the container. In the preferred construction, the reservoir is formed of a capillary mat material capable of storing electrolyte and may be formed of the same material as is used to form the separator and electrolyte storage material 20. As is readily apparent from the drawings, the reservoir is in liquid transfer contact with the separator and electrolyte storage material between the cathode and the anode. The reservoir is also continuous so that a uniform and continuous concentration of electrolyte is maintained throughout its entire extent. In the preferred construction, the separator mat and storage material 20 existing between the electrodes extends down into and is received by the reservoir 34. This insures adequate liquid transfer contact between the two different members thereby maintaining a required amount of electrolyte in the material 20.

The reservoir 34 and the separator and electrolyte storage material 20 may be one and the same material or they may be different materials. If they are the same material, the concentration per unit volume of electrolyte throughout the material generally will be the same. If the materials are different, the concentration of electrolyte in each material will be substantially uniform throughout the extent of each material but may be different than what is found in the other material depending upon the exact physical makeup of each material. The principal function of these materials are electrolyte storage.

The purpose of providing the reservoir 34 of a capillary mat material capable of storing electrolyte is to insure that the separator and electrolyte storage material 20 will always have a sufficient amount of electrolyte therein that the cell may operate properly. In particular although the gas generating and consuming anode 22 is generally impervious to the passage of electrolyte therethrough, some of the material does pass therethrough and become a vapor in the gas storage volume 16. This is particularly true in space applications wherein the forces of gravity are not present to retard the passage of the vapors through the gas generating and consuming anode 22. Thus some vapors do pass through the anode and are subsequently condensed on the container walls and thereby lost to the cell.

However, by provision of the reservoir 34, any electrolyte that is lost from the separator and electrolyte material 20 is drawn from the reservoir by capillary action and replaced. This insures that the battery cell 10 will operate at peak efficiency over its useful life.

In FIG. 2 there is seen the general construction of a battery 100 containing a pair of cells 102 and 104. In accordance with further teachings of this invention, the two cells have a single reservoir 134 interconnecting them. This reservoir 134 functions in the same manner as the reservoir 34 discussed in FIG. 1. In operation, the reservoir 134 serves to maintain a generally uniform concentration of electrolyte throughout the cells 102 and 104 even though there may be some loss of electrolyte from the individual cells. In this situation, if one cell lost more electrolyte than the other, there is still a uniform maintenance of electrolyte throughout both cells because of the interconnection thereby through use of the reservoir extending across both cells.

There has been disclosed herein a rechargeable electro-chemical cell providing a reservoir structure which insures that electrolyte is available for a continuous operation cell over the cell's useful life. In view of the teachings of this specification, those skilled in the art will be able to develop modifications of this cell structure which fall within the true spirit and scope of this invention. It is intended that all such modifications be included within the scope of the appended claims.

What we claim is:

1. In a rechargeable electrochemical cell including a closed container confining therewithin at least a cathode, a gas generating and consuming anode, a separator and electrolyte storage material between the cathode and the anode, an electrolyte in the storage material and an open volume for gas storage, the improvement which comprises:

providing within the closed container a reservoir formed of a capillary mat material capable of storing electrolyte, said reservoir being in liquid transfer contact with the separator and electrolyte storage material between the cathode and the anode, whereby losses of electrolyte from the separator and electrolyte storage material are substantially replaced by transfer of electrolyte from said reservoir to the separator and electrolyte storage material.

2. The improved electrochemical cell of claim 1 wherein:

the separator and electrolyte storage material between at least two cathode-anode combinations are in liquid transfer contact with a single reservoir of a capillary mat material capable of storing electrolyte.

3. The improved electrochemical cell of claim 1 wherein:

said reservoir and the separator and electrolyte storage material are formed of the same material.

4. The improved electrochemical cell of claim 2 wherein:

said reservoir and the separator and electrolyte storage material are formed of the same material.

5. The improved electrochemical cell of claim 3 wherein:

said material is a nonwoven nylon material.

6. The improved electrochemical cell of claim 4 wherein:

said material is a nonwoven nylon material.

* * * * *